United States Patent
Oishi et al.

[19]

[11] Patent Number: 6,095,622
[45] Date of Patent: Aug. 1, 2000

[54] HYDRAULIC BRAKE CONTROL SYSTEM FOR USE IN A VEHICLE

[75] Inventors: Masaki Oishi; Michiharu Nishii, both of Toyota, Japan

[73] Assignee: Aisin Seiki Kabushiki Kaisha, Kariya, Japan

[21] Appl. No.: 09/156,041

[22] Filed: Sep. 17, 1998

[30] Foreign Application Priority Data

Sep. 17, 1997 [JP] Japan ..................................... 9-252521

[51] Int. Cl.$^7$ ....................................................... B60T 8/32
[52] U.S. Cl. .................... 303/113.5; 188/358; 303/114.1; 303/113.2; 303/116.1; 303/DIG. 4
[58] Field of Search ................. 303/113.5, 186, 303/187, 188, 113.2, 113.3, 116.1, 116.2, 114.1, 139, 140, 135, 146, 147, 148, 189, 900, 901, DIG. 3, DIG. 4, 114.2; 188/349, 358, 359; 60/545, 547.1

[56] References Cited

U.S. PATENT DOCUMENTS

| | | |
|---|---|---|
| 4,310,201 | 1/1982 | Pauwels . |
| 4,565,411 | 1/1986 | Seiber . |
| 4,869,560 | 9/1989 | Nishii . |
| 4,874,207 | 10/1989 | Nishii et al. ......................... 303/114.1 |
| 5,013,094 | 5/1991 | Nishii et al. . |
| 5,454,632 | 10/1995 | Burgdorf et al. . |
| 5,624,164 | 4/1997 | Tozu et al. ............................ 303/113.5 |
| 5,897,175 | 4/1999 | Terazawa et al. . |
| 5,927,826 | 7/1999 | Sonnenschein . |

FOREIGN PATENT DOCUMENTS

| | | |
|---|---|---|
| 3927886 | 4/1990 | Germany . |
| 4110494 | 10/1992 | Germany . |
| 4141354 | 6/1993 | Germany . |
| 4409911 | 9/1995 | Germany . |

*Primary Examiner*—Douglas C. Butler
*Attorney, Agent, or Firm*—Burns, Doane, Swecker & Mathis, LLP

[57] ABSTRACT

A vehicle hydraulic brake control system includes a wheel brake for applying a hydraulic braking force to a wheel in response to a hydraulic pressure supplied to the wheel brake, a reservoir is which is stored brake fluid under the atmospheric pressure, a main hydraulic pressure source fluidly connected to the reservoir for generating a high hydraulic pressure in response to a force applied to an operating member of the vehicle, and an auxiliary hydraulic pressure source fluidly connected to the reservoir for generating another high hydraulic pressure. A control valve is fluidly connected to the main hydraulic pressure source, the auxiliary hydraulic pressure source, the wheel brake, and the reservoir for establishing a supply and drain of brake fluid under pressure to the wheel brake from either the main hydraulic pressure source or the auxiliary hydraulic pressure source. A fluid flow control device is provided in a passage connecting the auxiliary pressure source to a control valve to adjust the hydraulic pressure from the auxiliary pressure source to the control valve in two steps. When hydraulic pressure is supplied from the auxiliary pressure source to the wheel brake via the control valve, an increase rate of the hydraulic pressure in the wheel brake can be made quickly or slowly without operating the control valve on high cycles.

16 Claims, 5 Drawing Sheets

HYDRAULIC BRAKE CONTROL SYSTEM FOR USE IN A VEHICLE

This application corresponds to and claims priority under 35 U.S.C. § 119 with respect to Japanese Application No. 09(1997)-252521 filed on Sep. 17, 1998, the entire content of which is incorporated herein by reference.

FIELD OF THE INVENTION

The present invention generally relates to a vehicle brake control system. More particularly, the present invention pertains to a hydraulic brake control system that is designed to effect various types of wheel brake control such as anti-lock control, traction control, vehicle-body stability maintaining control, inter-vehicle distance maintaining control, and urgent brake assist control.

BACKGROUND OF THE INVENTION

Proposals have been made in the past for various braking concepts such as anti-lock control, traction control, vehicle-body stability maintaining control, inter-vehicle distance maintaining control, and urgent brake assist control. The anti-lock control is used to prevent a locked condition of a wheel through automatic control of a brake fluid pressure supplied to the wheel during depression of the brake pedal which is established for braking or decelerating the wheel. The traction control is designed to prevent idle rotation of a driving wheel by automatic control of brake fluid supplied to the wheel during depression of the acceleration pedal for accelerating a vehicle. The vehicle-body stability maintaining control prevents extreme over-steering operation or under-steering operation during a steering operation through automatic control of brake fluid supplied to the wheels. The inter-vehicle distance maintaining control is designed to maintain a fixed distance between a proceeding vehicle and a subsequent vehicle during a constant speed travel of the latter vehicle through automatic control of hydraulic brake pressure applied to the wheel. The urgent brake assist control automatically generates a larger braking force than a usual braking force corresponding to depression of the brake pedal when the brake pedal is depressed rapidly. Some of these braking concepts have been put into practical use.

To establish the foregoing brake concepts, a conventional hydraulic brake control system has been designed to include a wheel brake for applying a hydraulic braking force to a wheel in response to hydraulic pressure supplied to the wheel brake, a reservoir in which is stored an amount of brake fluid under atmospheric pressure, a main hydraulic pressure source fluidly connected to the reservoir for generating a high hydraulic pressure in response to a force applied to an operating member of the vehicle, an auxiliary hydraulic pressure source fluidly connected to the reservoir for generating another high hydraulic pressure, and a control valve fluidly connected to the main hydraulic pressure source, the auxiliary hydraulic pressure source, the wheel brake, and the reservoir. The control valve serves to establish a supply and drain of the brake fluid under pressure to the wheel brake from either the main hydraulic pressure source and the auxiliary hydraulic pressure source. Such a conventional hydraulic brake control system is disclosed in, for example, U.S. Pat. Nos. 4,869,560, 4,310,201, and 4,565,411.

In U.S. Pat. No. 4,869,560 and U.S. Pat. No. 4,565,411, the auxiliary hydraulic pressure source is in the form of an accumulator and a pump which supplies brake fluid under pressure to the accumulator from a reservoir. In U.S. Pat. No. 4,310,201, the auxiliary hydraulic pressure source is in the form of an accumulator, a pump supplying brake fluid under pressure to the accumulator from a reservoir, and a regulating valve reducing the high pressure from the accumulator to a set value.

In the conventional hydraulic brake control system, in situations where the brake fluid is applied to the wheel brake when the driver does not depress the brake pedal upon establishment of traction control, vehicle-body stability maintaining control, inter-vehicle distance maintaining control at a constant speed travel of the vehicle and so on, the hydraulic pressure is set to be applied from the auxiliary pressure source to the wheel brake. The traction control or the vehicle-body stability maintaining control requires a rapid increase or a dynamic rise of the hydraulic pressure in the wheel brake, whereas the inter-vehicle distance maintaining control requires a gradual increase or gentle rise of the hydraulic pressure in the wheel brake. Upon introduction or supply of the brake fluid to the wheel brake from the auxiliary hydraulic pressure source, the supply of hydraulic pressure to the wheel brake is established at a high speed. Thus, to establish the gradual increase or gentle rise of the hydraulic pressure in the wheel brake, the passage between the auxiliary hydraulic pressure source and the wheel brake has to be opened and closed in an intermittent manner by switching the control valve at high cycles.

However, a large hydraulic impulse is generated whenever the passage through which the hydraulic pressure of high magnitude is intermittently opened and closed by the control valve. The resulting vibration can cause undesirable noise generation.

A need exists for a hydraulic brake control system for use in a vehicle which is free from the foregoing disadvantage and drawback.

It would be desirable to provide a vehicle hydraulic brake control system which is capable of adjusting a flow rate of a brake fluid supplied to the auxiliary hydraulic pressure source to a wheel brake without switching a control valve at high cycles.

SUMMARY OF THE INVENTION

According to one aspect of the present invention, a vehicle hydraulic brake control system includes a wheel brake for applying a hydraulic braking force to the wheel in response to a hydraulic pressure supplied to the wheel brake, a reservoir for storing brake fluid under the atmospheric pressure, a main hydraulic pressure source fluidly connected to the reservoir for generating a first high hydraulic pressure in response to a force applied to an operating member of the vehicle, and an auxiliary hydraulic pressure source fluidly connected to the reservoir for generating a second high hydraulic pressure. A control valve is fluidly connected to the main hydraulic pressure source, the auxiliary hydraulic pressure source, the wheel brake, and the reservoir, for establishing a supply and drain of the brake fluid under pressure to the wheel brake from any one of the main hydraulic pressure source and the auxiliary hydraulic pressure source. A flow control device is provided in a passage between the auxiliary hydraulic pressure source and the control valve for controlling at least in two steps a flow rate of the brake fluid supplied to the wheel brake from the auxiliary hydraulic pressure source via the control valve.

Another aspect of the invention involves a vehicle hydraulic brake control system includes a wheel brake for applying a hydraulic braking force to the wheel in response to a hydraulic pressure supplied to the wheel brake, a reservoir for storing brake fluid under the atmospheric pressure, a main hydraulic pressure source fluidly connected to the reservoir for generating a first high hydraulic pressure in response to a force applied to an operating member of the vehicle, and an auxiliary hydraulic pressure source fluidly connected to the reservoir for generating a second high hydraulic pressure. A control valve is fluidly connected to the main hydraulic pressure source, the auxiliary hydraulic pressure source, the wheel brake, and the reservoir, for establishing a supply of brake fluid under pressure to the wheel brake from any one of the main hydraulic pressure source and the auxiliary hydraulic pressure source, and for establishing a drain of brake fluid from the wheel brake to the reservoir. A flow control device into which is inputted an input hydraulic pressure and from which is discharged an output hydraulic pressure is provided between the auxiliary hydraulic pressure source and the control valve for providing two different input hydraulic pressure to output hydraulic pressure characteristics.

BRIEF DESCRIPTION OF THE DRAWING FIGURES

The above and additional features and characteristics of the present invention will become more apparent with reference to the accompanying drawings figures in which like reference numerals denote like elements and wherein.

DETAILED DESCRIPTION OF THE PREFERRED EMBODIMENTS

Figure 1:
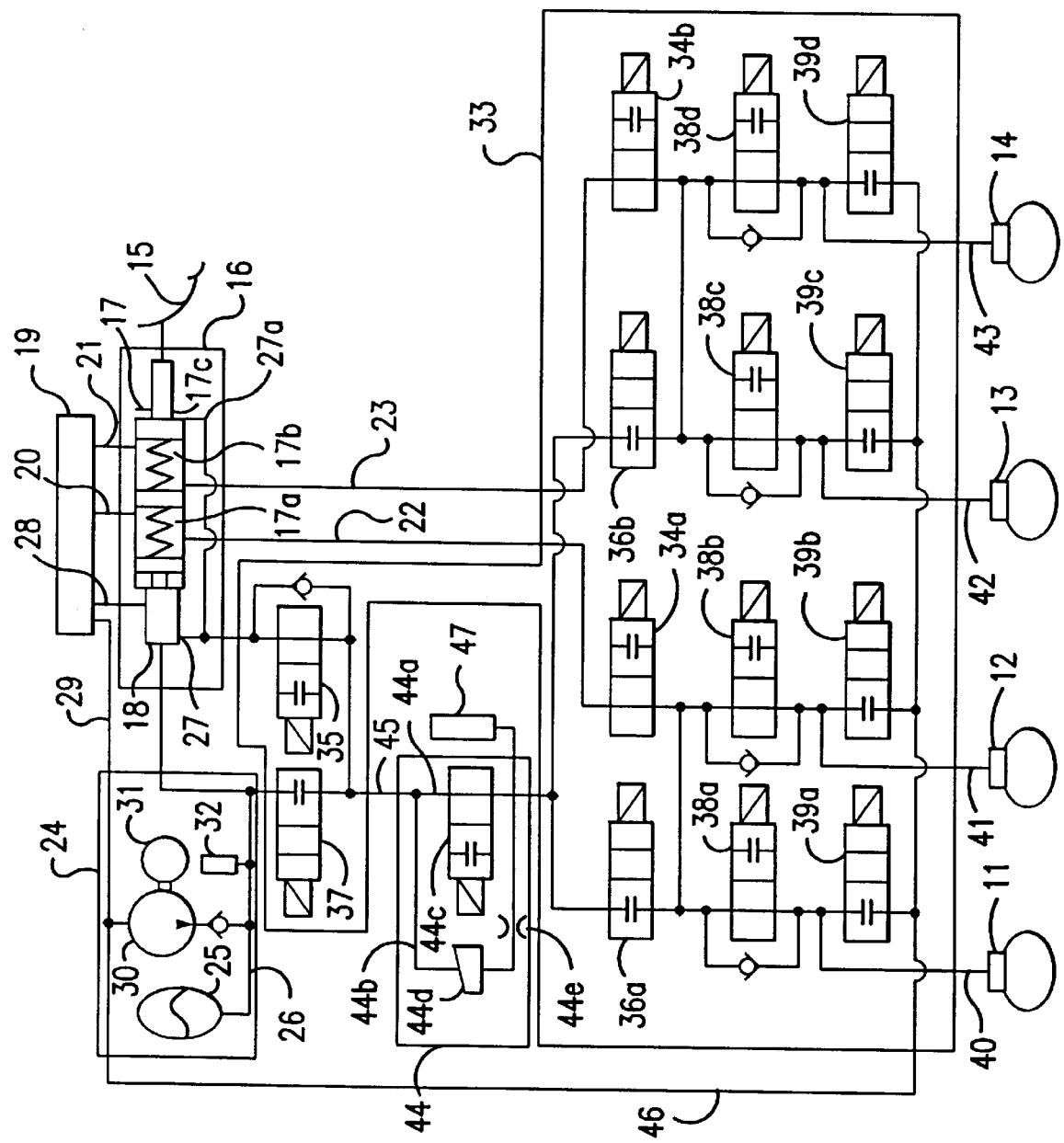
FIG. 1 is a block diagram illustrating a first embodiment of a hydraulic pressure brake control system for use in a vehicle in accordance with the present invention.

Referring initially to FIG. 1, the hydraulic pressure brake control system for vehicles in accordance with the present invention includes a front-right wheel brake 11, a rear-left wheel brake 12, a front-left wheel brake 13, and a rear-right wheel brake 14. Depending upon the hydraulic pressure supplied to the wheel brakes, the wheel brakes 11, 12, 13, 14 apply braking forces to the front-right wheel, the rear-left wheel, the front-left wheel, and the rear-right wheel, respectively.

The force applied to the brake pedal 15 when a driver depresses the brake pedal 15 is inputted or transmitted to a tandem master cylinder 17 which-constitutes a principal hydraulic pressure source 16. In addition to the tandem master cylinder 17, the principal hydraulic pressure source 16 includes a regulating valve 18 which is provided at the front side of the tandem master cylinder 17. Defined within the tandem master cylinder 17 is a pair of pressure generating chambers 17a, 17b which are connected, via respective passages 20, 21, to a common reservoir 19 in which an amount of brake fluid is stored under atmospheric pressure. The pressure of the brake fluid in the pressure generating chambers 17a, 17b is increased in response to the degree or amount of depression of the brake pedal and the resultant or increased pressures in the chambers 17a, 17b are supplied to the passages 22, 23, respectively.

The tandem master cylinder 17 also includes an assisting chamber 17c which assists the pressure increase in the pressure generating chambers 17a, 17b by using the hydraulic pressure discharged from the regulating valve 18.

The depression force applied to the brake pedal 15 is also transmitted or inputted to the regulating valve 18 by way of the tandem master cylinder 17. The regulating valve 18 regulates the high hydraulic pressure supplied, via the passage 26, from an accumulator 25 serving as an auxiliary pressure source. The regulating valve 18 regulates this pressure to a pressure corresponding to the brake pedal depression force and outputs the resultant pressure to a passage 27. More specifically, if the pressure in the passage 27 is less than that corresponding to the brake pedal depression force, the regulating valve 18 increases the pressure in the passage 27 by isolating the passage 27 from a passage 28 which is in continual fluid communication with the reservoir 19. In contrast, if the pressure in the passage 27 is higher than that corresponding to the brake pedal depression force, the regulating valve 18 begins to decrease the pressure in the passage 27 by establishing fluid communication of the passage 28 with the passage 27 and a concurrent isolation of the passage 27 from the passage 26. The pressure in the passage 27 is supplied, via a bypass passage 27a, to the assisting chamber 17c of the tandem master cylinder 17.

The auxiliary pressure source 24 is mainly comprised of the accumulator 25, a hydraulic pressure pump 30 which discharges hydraulic pressure into the passage 26 by sucking the brake fluid from the reservoir 19 via a passage 29, an electric motor 31 for driving the hydraulic pressure pump 30, and a pressure gauge 32 for detecting the pressure in the accumulator 25. When the pressure in the accumulator 25 is found to be less than its lower limit, the electric motor 31 is turned on to drive the hydraulic pressure pump 30 and thereby increase the pressure in the accumulator 25. When the pressure detected by the pressure gauge 32 exceeds an upper limit of the pressure in the accumulator 25 the resulting increase of the pressure is interrupted immediately by turning off the electric motor 31. This results in a termination of the operation of the hydraulic pressure pump 30. Thus, the high pressure remains unchanged in the accumulator 25.

A control valve 33 functions to establish a supply and drain control of the hydraulic pressure between each of the wheel brakes 11, 12, 13, 14 and a hydraulic pressure source selected from one of the tandem master cylinder 17, the regulating valve 18, and the accumulator 25. The control valve 33 includes a set of normally opened electromagnetic open-close valves 34a, 34b, 35 which act as a mechanism for effecting the aforementioned selection, a set of normally closed electromagnetic open-close valves 36a, 36b, 37, a set of normally opened electromagnetic open-close valves 38a, 38b, 38c, 38d each of which is used to increase, decrease and maintain hydraulic pressure in the corresponding wheel brake individually, and a set of normally closed electromagnetic open-close valves 39a, 39b, 39c, 39d.

Normally, the tandem master cylinder 17 is selected to be the hydraulic pressure source. Upon establishment of an anti-lock braking control, the regulating valve 18 is employed as the hydraulic pressure source. If any one of the traction control, the vehicle-body stability maintaining control, and the inter-vehicle distance control during a fixed speed vehicle travel is to be established, the accumulator 25 is chosen as the hydraulic pressure source.

Normally, the hydraulic pressure in the pressure generating chamber 17*a* of the tandem master cylinder 17 is supplied, via the passage 22, the valve 34*a*, the valve 38*a* and a passage 40, to the wheel brake 11. The resultant hydraulic pressure is drained or returned from the wheel brake 11 to the chamber 17*a* by way of the same path or route in a reverse direction. The hydraulic pressure in the chamber 17*a* is also supplied, via the passage 22, the valve 34*a*, the valve 38*b* and a passage 41, to the wheel brake 12. The resultant hydraulic pressure is drained or returned from the wheel brake 12 to the chamber 17*a* by way of the same path or route in a reverse direction.

The hydraulic pressure in the pressure generating chamber 17*b* of the tandem master cylinder 17 is supplied, via the passage 23, the valve 34*b*, the valve 38*c* and a passage 42, to the wheel brake 13. The resulting pressure is drained or returned from the wheel brake 13 to the chamber 17*b* by way of the same path or route in reverse. The hydraulic pressure in the chamber 17*b* is also supplied, via the passage 23, the valve 34*b*, the valve 38*d* and a passage 43, to the wheel brake 14. The resulting pressure is drained or returned to the chamber 17*b* by way of the same path or route in reverse.

If at least one of the front-right wheel to be braked by the wheel brake 11 and the rear-left wheel to be braked by the wheel brake 12 is desired to be brought into anti-lock braking operation, the valve 34*a* and the valve 36*a* are turned on. The result is that the hydraulic pressure outputted from the regulating valve 18 is fed to both of the valves 38*a*, 38*b*, via the passage 27, a passage 45 in which is disposed a flow control valve 44 which will be detailed later, and the valve 36*a*. Also, the hydraulic pressure from the chamber 17*a* is cut-off. Under the resultant condition, when the pressure in the wheel brake 11 is desired to be decreased, both of the valves 38*a*, 39*a* are turned on, thereby draining the hydraulic pressure in the wheel brake 11 into the reservoir 19 via the valve 39*a* and the passage 46. If a reincrease of the hydraulic pressure is desired in the wheel brake 11, the wheel brake 11 is supplied with the hydraulic pressure from the regulating valve 18 by turning off both of the valves 38*a*, 39*a*. Maintaining the hydraulic pressure as is, in the wheel brake 11, can be established by turning the valve 38*a* on and turning off the valve 39*a*.

Similarly, when the pressure in the wheel brake 12 is desired to be decreased, both of the valves 38*b*, 39*b* are turned on, thereby draining the hydraulic pressure in the wheel brake 12 into the reservoir 19 via the valve 39*b* and the passage 46. If a reincrease of the hydraulic pressure is desired in the wheel brake 12, the wheel brake 12 is supplied with hydraulic pressure from the regulating valve 18 by turning off both of the valves 38*b*, 39*b*. For maintaining the hydraulic pressure as is in the wheel brake 12, the valve 38*b* is turned on and the valve 39*b* is turned off. The result is that no supply and no drain of the hydraulic pressure to and from the wheel brake 12 is established.

If one or both of the front-left wheel to be braked by the wheel brake 13 and the rear-right wheel to be braked by the wheel brake 14 is desired to be driven under anti-lock control, the valves 34*b*, 36*b* are turned on. The result is that the hydraulic pressure outputted from the regulating valve 18 is supplied to both of the valves 38*c*, 38*d* via the passage 27, the passage 45, and the valve 36*b*. Also, the hydraulic pressure from the chamber 17*b* is prevented. Under such a condition, similar to the control modes described above, controlling the valves 38*c*, 39*c* establishes a pressure decreasing mode, a pressure increasing mode, and a pressure maintaining mode of the wheel brake 13. Likewise, the wheel brake 14 is also kept at any one of its pressure decreasing mode, pressure increasing mode, and pressure maintaining mode in a manner similar to that described above.

While the brake pedal is not being depressed, if either the traction control or vehicle-body stability maintaining control mode is selected or needed, it is necessary that at least one of the front-right wheel, the front-left wheel, the rear-right wheel, and the rear-left wheel be braked. To meet such a need, the set of valves 35, 37, the set of valves 34*a*, 36*a*, and/or the set of valves 34*b*, 36*b* are turned on. The result is that the high hydraulic pressure in the accumulator 25 is supplied to the set of valves 38*a*, 38*b*, and/or the set of the valves 38*c*, 38*d* via the passage 26, the passage 45, and the respective valve 36*a*, 36*b*. For example, in the case where the rear-right wheel and the rear-left wheel are to be braked, the valves 34*a*, 34*b*, 36*a*, 36*b*, 35 and 37 are turned on. Thus, the high hydraulic pressure in the accumulator 25 is fed to the valves 38*a*, 38*b* via the passage 26, the passage 45, and the valve 36*a*. Concurrently, the high pressure in the accumulator 25 is also supplied to the valves 38*c*, 38*d* via the passage 26, the passage 45, and the valve 36*b*. As another example, if only the front-right wheel (the front-left wheel) is to be braked, the valves 35, 37 are turned on in addition to turning on the valves 34*a*, 36*a* (the valves 34*b* and 36*b*), by which the high hydraulic pressure in the accumulator 25 is introduced to the set of valves 38*a*, 38*b* (the set of the valves 38*c* and 38*d*) via the passage 26, the passage 45, and the valve 36*a* (via the passage 26, the passage 45, and the valve 36*b*).

As mentioned above, if the rear-right wheel and the rear-left wheel are desired to be braked, the valve 38*a* and the valve 38*c* are turned on or closed to prevent the supply of hydraulic pressure to the respective wheel brakes 11, 13 before the valves 38*a*, 38*b*, 38*c*, 38*d* are supplied with the hydraulic pressure from the accumulator 25. Furthermore, in the case of braking only the front-right wheel (front-left wheel), the wheel brake 12 (the wheel brake 14) is prevented from being supplied with the hydraulic pressure by turning on or closing the valve 38*b* (the valve 38*d*) in advance of the supply of the hydraulic pressure from the accumulator 25 to the valve 38*b* (the valve 38*d*).

During the traction control or the vehicle-body stability maintain control, the hydraulic pressure in the live or under-controlled wheel brake such as the wheel brake 11 is adjusted by switching each of the valves 38*a*, 39*a*.

While the vehicle constant-speed cruising control is being established when the brake pedal is not depressed, if it is desired to operate the inter-vehicle distance control, the valves 34*a*, 34*b*, 36*a*, 36*b*, 35, 37 are turned on, thereby supplying the high hydraulic pressure in the accumulator 25 to the set of valves 38*a*, 38*b*, 38*c*, 38*d* via the passage 26, the passage 45 and the valves 36*a*, 36*b*. Thus, the hydraulic pressure supplied to the respective valves 38*a*, 38*b*, 38*c*, 38*d* is fed to the respective wheel brakes 11, 12, 13, 14. While a hydraulic brake fluid supply is being established, the flow control device 44 provided in the passage 45 makes the pressure increase in each of the wheel brakes 11, 12, 13, 14 gradual or gentle, which means that the maximum hydraulic pressure supplied to each of the wheel brakes 11, 12, 13, 14 is restricted so as to be less than the maximum pressure in the accumulator 25.

The flow control device 44 includes a first passage 44*a*, a second passage 44*b* arranged in parallel to the first passage 44a, a normally opened electromagnetic open-close valve 44c provided in the first passage 44a, a pressure reducing valve 44d provided in the second passage 44b, and an orifice 44e provided in the second passage 44b so as to be located on the output side or downstream side of the pressure reducing valve 44d. The flow control device 44 is also provided or equipped with a pressure gauge 47 connected to the orifice 44e for detecting the hydraulic pressure at the output side of the flow control device 44.

Figure 2:
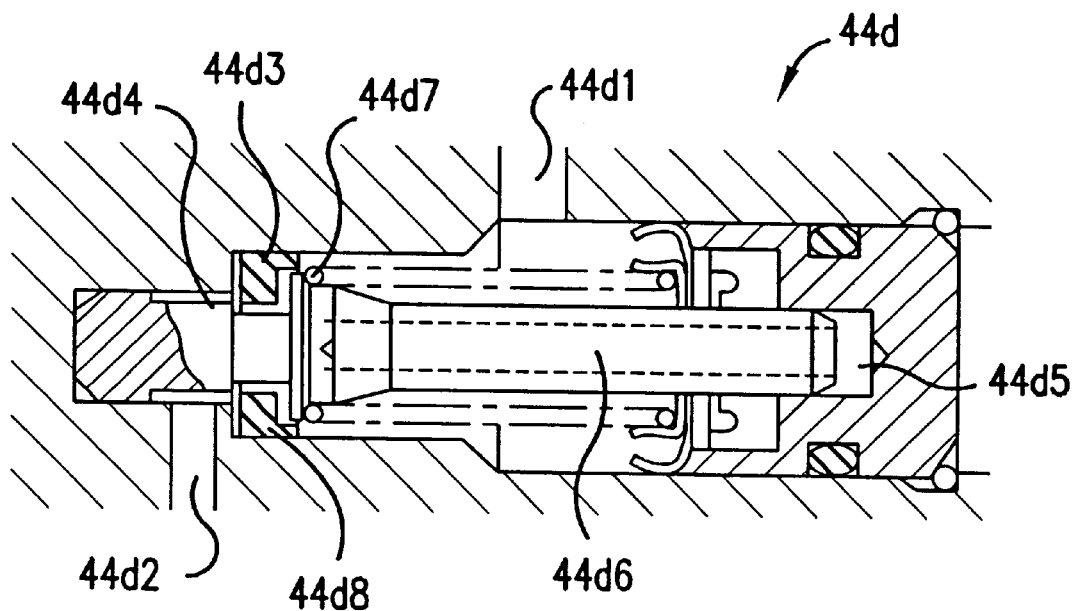
FIG. 2 is a cross-sectional view of a pressure reducing valve employed in the hydraulic pressure brake control system shown in FIG. 1.

As shown in FIG. 2, the pressure reducing valve 44d, which is a proportioning valve or so-called P-valve, includes an inlet port 44d1 connected to the valves 35, 37, an outlet port 44d2, a passage extending from the inlet port 44d1 to the output port 44d2, an annular valve seat member 44d3 located in the passage and having a central hole, a valve piston 44d6, and a spring 44d7. The valve piston 44db has a left end portion and a right end portion, and is constructed such that at the left end portion a valve head 44d4 is located at the downstream side of the central hole of the valve seat member 44d3 for controlling the fluid flow from the inlet port 44d1 to the outlet port 44d2 and such that the right end portion is slidably fitted in an air chamber 44d5 to be exposed to an air. The spring 44d7 biases the valve piston 44d6 for moving the valve head 44d4 away from the valve seat member 44d3. The annular valve seat member 44d3 is formed at its outer periphery with a rip or a slit functioning as a check valve which permits only a fluid flow from the side of the outlet port 44d2 to the side of the inlet port 44d1.

Figure 3:
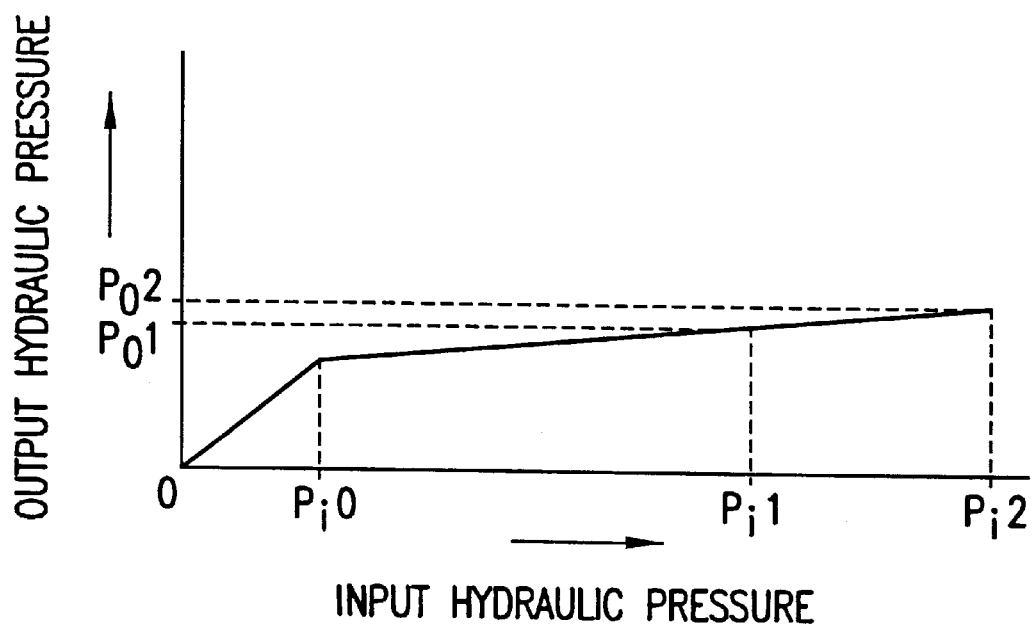
FIG. 3 shows the relationship between the input hydraulic pressure and the output hydraulic pressure in the pressure reducing valve shown in FIG. 2.

The pressure reducing valve 44 having the foregoing structure is known as a proportioning valve or a so-called P-valve which reduces the hydraulic pressure discharged to the rear wheel brakes. The graph in FIG. 3 illustrates the relationship between the input pressure and the output pressure at the pressure reducing valve 44d. It is to be noted that $P_i1$ and $P_i2$ denote the lower and upper limits, respectively, of the pressure in the accumulator 25. The pressure reducing valve 44d is designed to perform its pressure reducing operation immediately when the input pressure or the hydraulic pressure supplied to the inlet port 44d1 reaches a value of $P_iO$ which depends on both the spring constant of the spring 44d7 and the cross-sectional area of the valve piston 44d6. It is also to be noted that by equalizing the valve head 44d4 and the right end portion of the valve piston 44d6 in diameter, if the input pressure exceeds $P_i1$ the output pressure can remain a constant value.

Figure 4:
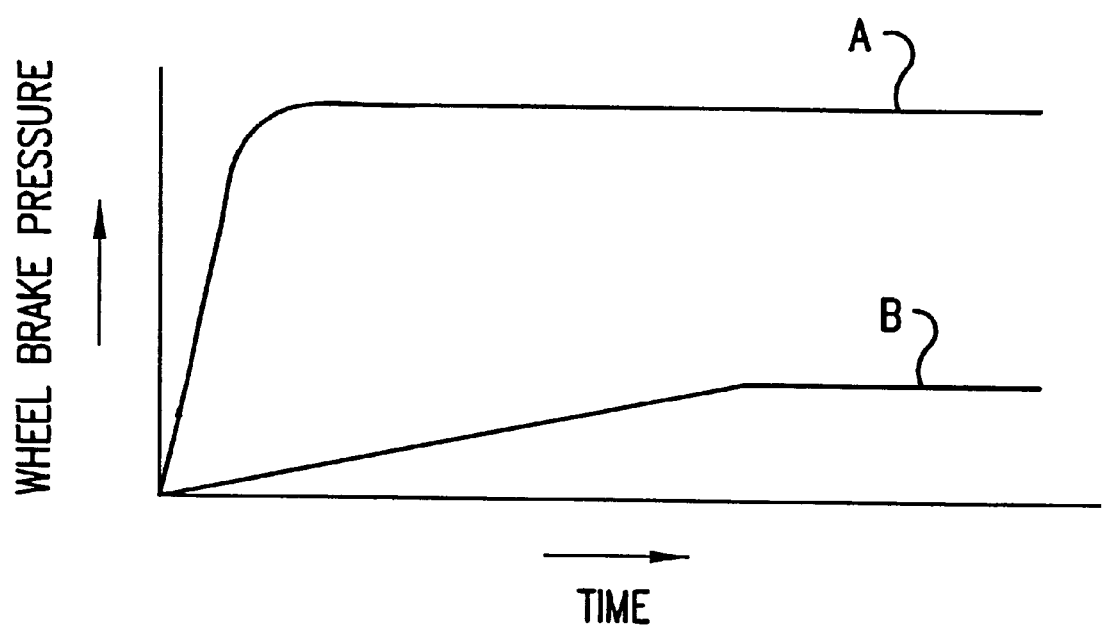
FIG. 4 is a graph showing the wheel pressure increase with the passage of time.

The valve 44c of the flow control device 44 is set to be inactive when a rapid or quick pressure increase in each of the wheel brakes is required under traction control or vehicle-body stability maintaining control. In contrast, the valve 44c is turned on or made to be active when a gradual or gentle pressure increase in each of the wheel brakes is required under inter-vehicle constant distance control. The hydraulic or brake fluid as a high hydraulic pressure accumulated or stored in the accumulator 25 is supplied to the wheel brake to be supplied with the hydraulic pressure via either the passage 44a when the valve 44c is inactive or the passage 44b when the valve 44c is active. The quantity of brake fluid passing through the passage 44b of the flow control device 44 is considerably smaller than that passing through the passage 44a. This is due to the fact that the existence of the orifice 44e in the passage 44b and that at the upstream side of the orifice 44e the brake fluid pressure ranging from $P_i1$ to $P_i2$ is reduced to the value ranging from $P_o1$ to $P_o2$. Thus, as can be seen from FIG. 4 the hydraulic pressure in the wheel brake can be increased rapidly or in dynamic to a value equivalent to the output pressure from the accumulator 25 which follows the graph A. In addition, as indicated by the graph B supplying the brake fluid accumulated in the accumulator 25 to the wheel brake by way of the passage 44b of the flow control device 44, the hydraulic pressure in the wheel brake can be increased slowly to a value equivalent to the output hydraulic pressure of the pressure reducing valve 44d. In particular, unlike a direct supply of the pressure from the accumulator 25 to the orifice 44e, adjusting the hydraulic pressure at the upstream side of the orifice 44e to less than the pressure of the accumulator 25 by using the pressure reducing valve 44d enables the opening area of the orifice 44e to be enlarged. Thus, unexpected closure of the orifice by impure particles contained in the brake fluid can be prevented.

It is noted that an additional orifice can be provided in the passage 44a of the flow control device 44 for adjusting the pressure increasing speed or rate.

A continual monitoring or detection of the pressure gauge 47 enables a detection of a failure or malfunction of the pressure control device 44.

During the inter-vehicle constant distant control mode, the turning on or opening of the valves 39a, 39b, 39c, 39d drains the brake fluid in the respective wheel brakes 11, 12, 13, 14 to the reservoir 19, with the result that the pressure in the respective wheel brakes 11, 12, 13, 14 is decreased. Furthermore, because the lip 44d8 is provided in the pressure reducing valve 44d which acts as a one-way valve for permitting a flow of the brake fluid toward the reservoir 19, only turning off the valves 35 and 37 enables the brake fluids in the wheel brakes 11, 12, 13, 14 to be drained to the reservoir 19 via the pressure regulating valve 18. This draining of the brake fluid in the respective wheel brakes 11, 12, 13, 14 can advantageously be established without turning on or opening the valves 39a, 39b, 39c, 39d.

Figure 5:
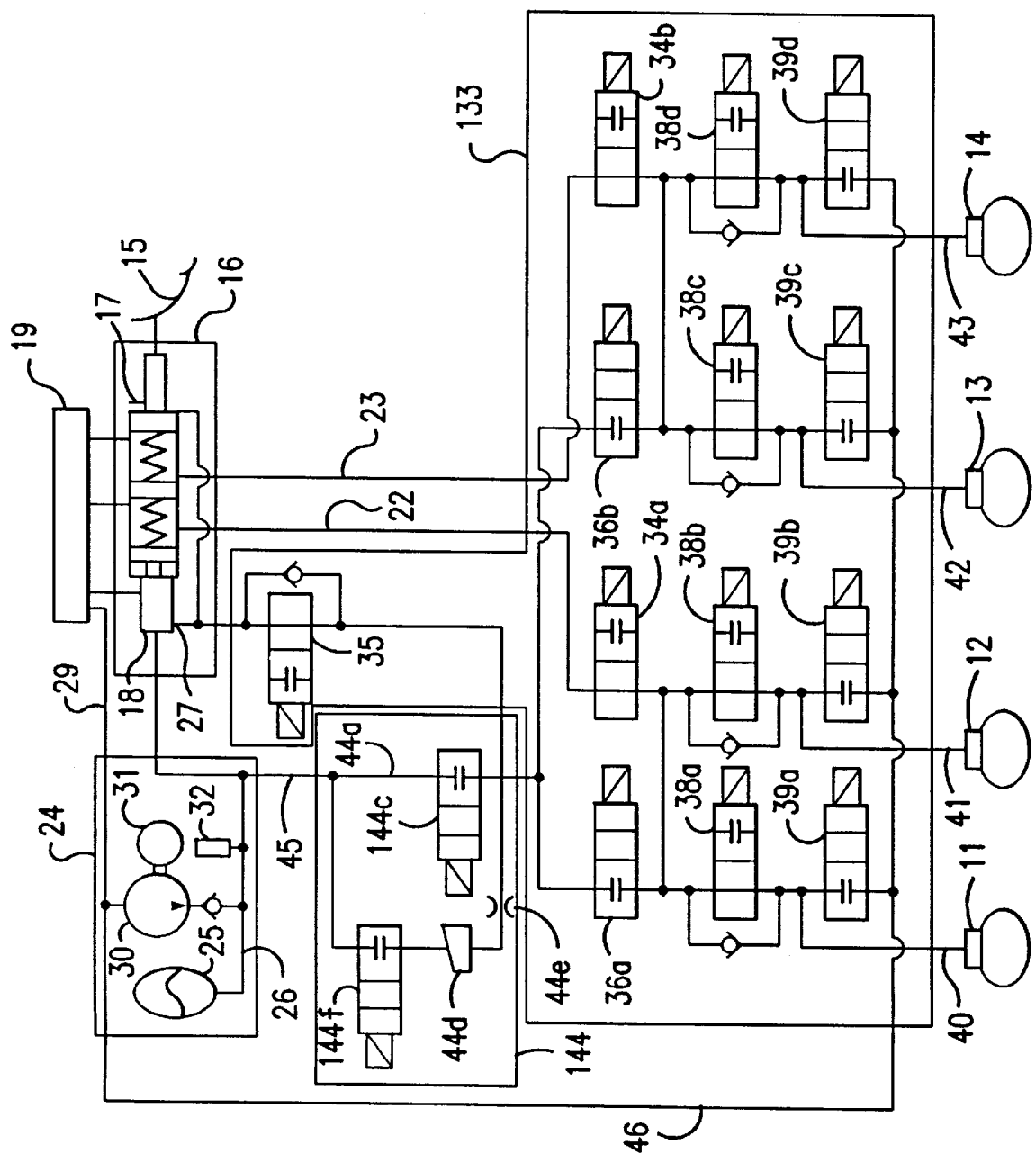
FIG. 5 is a block diagram illustrating a hydraulic pressure brake control system for use in a vehicle in accordance with a second embodiment of the present invention.

FIG. 5 schematically illustrates a block diagram of a hydraulic pressure brake control system in accordance with a second embodiment of the present invention. This system is substantially the same as the system according to the first embodiment of the present invention, and features and elements in the second embodiment that are the same as in the first embodiment are designated by the same reference numerals. The second embodiment differs from the first embodiment in the following manner. The second embodiment includes a flow control device 144 in which a normally closed open-close electromagnetic valve 144c is provided in a first passage 44a, and a normally closed open-close electromagnet valve 144f is provided in a second passage 44b. The second passage 44b is parallel to the first passage 44a. The output hydraulic pressure from a regulating valve 18 is supplied to the output or downstream side of the flow control device 144 via an electromagnetic open-close valve 35. In this second embodiment, the control valve 133 is not equipped with an electromagnetic open-close valve similar to the electromagnetic open-close valve 37 shown in FIG. 1, and no device corresponding to the pressure gauge 47 is provided.

In the second embodiment, in situations where a rapid increase or a dynamic rise of the wheel brake pressure is required, for example under traction control or vehicle-body stability control, the valve 144c is set to be turned on or opened. In contrast, if a gradual pressure increase in the wheel brake is required, for example under an inter-vehicle constant distance control mode, the valve 144f is turned on. The operation and function of the second embodiment are identical with those of the first embodiment.

Figure 6:
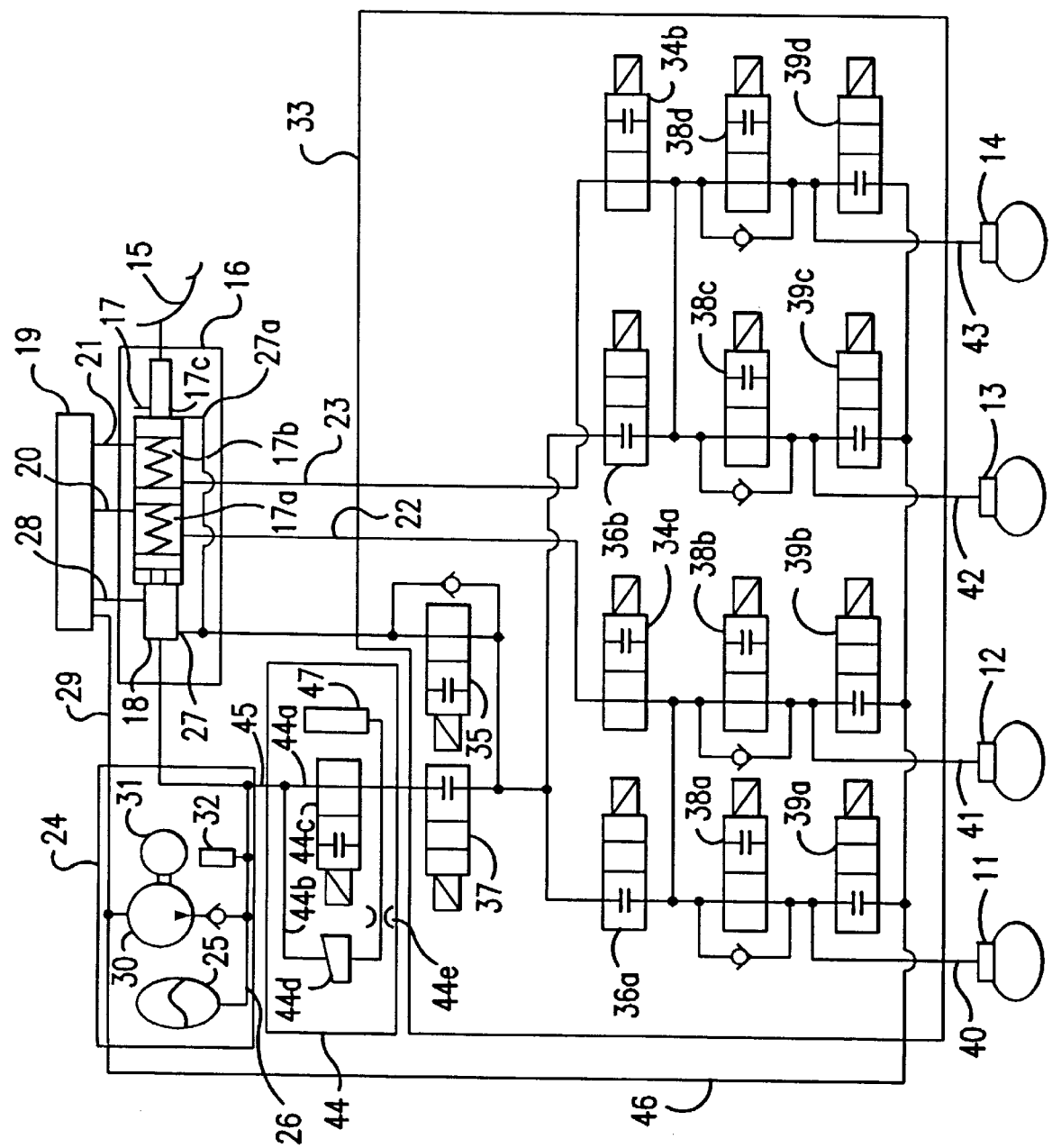
FIG. 6 is a block diagram illustrating a hydraulic pressure brake control system for use in a vehicle in accordance with a third embodiment of the present invention.

FIG. 6 schematically illustrates a block diagram of a hydraulic pressure brake control system in accordance with a third embodiment of the present invention. This system is substantially identical with the system according to the first embodiment except that in the third embodiment the flow control device 44 is located upstream of the electromagnetic valve 37. The operation and function of the third embodiment are identical with those of the first embodiment, and features in the third embodiment corresponding to features in the first embodiment are identified with the same reference number.

It is to be understood that instead of the two-step flow rate control in the flow control device, linear flow rate control of brake fluid is possible.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A hydraulic brake control system for use in a vehicle, comprising:
   a wheel brake for applying a hydraulic braking force to a wheel in response to a hydraulic pressure supplied to the wheel brake;
   a reservoir for storing brake fluid under the atmospheric pressure;
   a main hydraulic pressure source fluidly connected to the reservoir for generating a first high hydraulic pressure in response to a force applied to an operating member of the vehicle;
   an auxiliary hydraulic pressure source fluidly connected to the reservoir for generating a second high hydraulic pressure;
   a control valve fluidly connected to the main hydraulic pressure source, the auxiliary hydraulic pressure source, the wheel brake, and the reservoir, for establishing a supply and drain of the brake fluid under pressure to the wheel brake from any one of the main hydraulic pressure source and the auxiliary hydraulic pressure source; and
   a flow control device provided in a passage between the auxiliary hydraulic pressure source and the control valve for controlling at least in two steps a flow rate of the brake fluid supplied to the wheel brake from the auxiliary hydraulic pressure source via the control valve.

2. A hydraulic brake control system as set forth in claim 1, wherein the main hydraulic pressure source includes a master cylinder that is adapted to generate the first high hydraulic pressure in response to the force applied to the operating member of the vehicle, the master cylinder having a regulating valve that substantially equalizes the second high hydraulic pressure generated in the auxiliary hydraulic pressure source to the first high hydraulic pressure generated in the main hydraulic pressure source and an assisting chamber supplied the resultant hydraulic pressure from the regulating valve, the control valve being fluidly connected to the master cylinder, the regulating valve, the auxiliary hydraulic pressure source, the wheel brake, and the reservoir and being adapted to establish a supply and drain control of the brake fluid to the wheel brake from any one of the regulating valve and the auxiliary hydraulic pressure source, the brake fluid being supplied to the control valve via the passage in which the flow control device is provided.

3. A hydraulic brake control system as set forth in claim 2, wherein the flow control device includes a first passage, a second passage arranged in parallel to the first passage, an electromagnetic open-close valve provided in the first passage, a pressure reducing valve located in the second passage for reducing pressure in the second passage, and an orifice located in the second passage at an output side of the pressure reducing valve.

4. A hydraulic brake control system as set forth in claim 3, including a pressure gauge operatively associated with the flow control device for detecting pressure at the flow control device.

5. A hydraulic brake control system as set forth in claim 2, wherein the flow control device includes a first passage, a second passage arranged in parallel to the first passage, a first electromagnetic open-close valve located in the first passage, a second electromagnetic open-close valve located in the second passage, a pressure reducing valve located in the second passage between the first and second electromagnetic open-close valves, and an orifice located in the second passage at an output side of the pressure reducing valve.

6. A hydraulic brake control system as set forth in claim 5, including a pressure gauge operatively associated with the flow control device for detecting pressure at the flow control device.

7. A hydraulic brake control system as set forth in claim 1, wherein the flow control device includes a first passage, a second passage arranged in parallel to the first passage, an electromagnetic open-close valve provided in the first passage, a pressure reducing valve located in the second passage for reducing pressure in the second passage, and an orifice located in the second passage at an output side of the pressure reducing valve.

8. A hydraulic brake control system as set forth in claim 7, including a pressure gauge operatively associated with the flow control device for detecting pressure at the flow control device.

9. A hydraulic brake control system as set forth in claim 1, wherein the flow control device includes a first passage, a second passage arranged in parallel to the first passage, a first electromagnetic open-close valve located in the first passage, a second electromagnetic open-close valve located in the second passage, a pressure reducing valve located in the second passage between the first and second electromagnetic open-close valves, and an orifice located in the second passage at an output side of the pressure reducing valve.

10. A hydraulic brake control system as set forth in claim 9, including a pressure gauge operatively associated with the flow control device for detecting pressure at the flow control device.

11. A hydraulic brake control system for use in a vehicle, comprising:
    a wheel brake for applying a hydraulic braking force to a wheel in response to hydraulic pressure supplied to the wheel brake;
    a reservoir for storing brake fluid under the atmospheric pressure;
    a main hydraulic pressure source fluidly connected to the reservoir for generating a first hydraulic pressure in response to a force applied to an operating member of the vehicle;

an auxiliary hydraulic pressure source fluidly connected to the reservoir for generating a second hydraulic pressure;

a control valve fluidly connected to the main hydraulic pressure source, the auxiliary hydraulic pressure source, the wheel brake, and the reservoir, for establishing a supply of brake fluid under pressure to the wheel brake from any one of the main hydraulic pressure source and the auxiliary hydraulic pressure source, and for establishing a drain of brake fluid from the wheel brake to the reservoir; and a flow control device into which is inputted an input hydraulic pressure and from which is discharged an output hydraulic pressure, said flow control device being provided between the auxiliary hydraulic pressure source and the control valve for providing two different input hydraulic pressure to output hydraulic pressure characteristics.

12. A hydraulic brake control system as set forth in claim 11, wherein the main hydraulic pressure source includes a master cylinder that is adapted to generate the first high hydraulic pressure in response to the force applied to the operating member of the vehicle, the master cylinder having a regulating valve that substantially equalizes the second high hydraulic pressure generated in the auxiliary hydraulic pressure source to the first high hydraulic pressure generated in the main hydraulic pressure source and an assisting chamber supplied the resultant hydraulic pressure from the regulating valve, the control valve being fluidly connected to the master cylinder, the regulating valve, the auxiliary hydraulic pressure source, the wheel brake, and the reservoir and being adapted to establish a supply control of the brake fluid to the wheel brake from any one of the regulating valve and the auxiliary hydraulic pressure source, the brake fluid being supplied to the control valve via the passage in which the flow control device is provided.

13. A hydraulic brake control system as set forth in claim 11, wherein the flow control device includes a first passage, a second passage arranged in parallel to the first passage, a first electromagnetic open-close valve located in the first passage, a second electromagnetic open-close valve located in the second passage, a pressure reducing valve located in the second passage between the first and second electromagnetic open-close valves, and an orifice located in the second passage at an output side of the pressure reducing valve.

14. A hydraulic brake control system as set forth in claim 11, including a pressure gauge operatively associated with the flow control device for detecting pressure at the flow control device.

15. A hydraulic brake control system as set forth in claim 11, wherein the flow control device includes a first passage, a second passage arranged in parallel to the first passage, an electromagnetic open-close valve provided in the first passage, a pressure reducing valve located in the second passage for reducing pressure in the second passage, and an orifice located in the second passage at an output side of the pressure reducing valve.

16. A hydraulic brake control system as set forth in claim 11, including a normally opened open-close electromagnetic valve positioned between the flow control device and the auxiliary hydraulic pressure source.

* * * * *